United States Patent
Jin et al.

(10) Patent No.: US 7,337,281 B2
(45) Date of Patent: Feb. 26, 2008

(54) STORAGE SYSTEM AND DATA CACHING METHOD IN THE SYSTEM

(75) Inventors: Yonggen Jin, Odawara (JP); Youichi Gotoh, Odawara (JP); Shinichi Nakayama, Chigasaki (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/770,007

(22) Filed: Feb. 3, 2004

(65) Prior Publication Data

US 2005/0114592 A1    May 26, 2005

(30) Foreign Application Priority Data

Nov. 26, 2003   (JP)   ............... 2003-396296

(51) Int. Cl.
*G06F 12/08* (2006.01)
*G06F 12/10* (2006.01)

(52) U.S. Cl. ...................... 711/143; 711/130
(58) Field of Classification Search ............ None
See application file for complete search history.

(56) References Cited

U.S. PATENT DOCUMENTS

| | | | |
|---|---|---|---|
| 5,717,893 A | | 2/1998 | Mattson |
| 5,751,993 A | * | 5/1998 | Ofek et al. .............. 711/136 |
| 5,893,140 A | * | 4/1999 | Vahalia et al. ............ 711/118 |
| 6,145,058 A | | 11/2000 | Suganuma |
| 6,289,398 B1 | | 9/2001 | Stallmo et al. |
| 6,304,980 B1 | * | 10/2001 | Beardsley et al. ............ 714/6 |
| 6,341,331 B1 | | 1/2002 | McNutt |
| 6,457,100 B1 | * | 9/2002 | Ignatowski et al. ......... 711/119 |
| 6,611,899 B2 | | 8/2003 | Takahashi et al. |
| 6,615,313 B2 | | 9/2003 | Kato et al. |
| 6,629,211 B2 | | 9/2003 | McKnight et al. |
| 6,651,139 B1 | | 11/2003 | Ozeki et al. |
| 6,681,339 B2 | * | 1/2004 | McKean et al. ............ 714/5 |
| 6,917,967 B2 | * | 7/2005 | Wu et al. ................. 709/213 |
| 7,020,754 B1 | * | 3/2006 | Walton et al. ............. 711/162 |
| 2002/0083270 A1 | * | 6/2002 | Chilton ................... 711/130 |
| 2002/0144076 A1 | | 10/2002 | Yamamoto et al. |
| 2003/0046460 A1 | * | 3/2003 | Inoue et al. .............. 710/38 |
| 2003/0101317 A1 | | 5/2003 | Mizuno et al. |
| 2003/0149839 A1 | | 8/2003 | Kuwata |
| 2003/0188233 A1 | * | 10/2003 | Lubbers et al. ............ 714/100 |
| 2004/0003184 A1 | * | 1/2004 | Safranek et al. ........... 711/146 |
| 2004/0210713 A1 | | 10/2004 | Kanai |
| 2005/0050268 A1 | | 3/2005 | Yoshida |

* cited by examiner

FOREIGN PATENT DOCUMENTS

JP   2000339101   12/2000

*Primary Examiner*—Gary Portka
*Assistant Examiner*—Duc T. Doan
(74) *Attorney, Agent, or Firm*—Mattingly, Stanger, Malur & Brundidge, PC

(57) ABSTRACT

A channel adapter connected to a host has a local cache memory. The channel adapter duplexes and writes the write-data in the local cache memory in response to a data-write request from the host. Then, the channel adapter sends the write-completion to the host and transfers all of the write-data within the local cache memory to the main cache memory in asynchronous timing. The channel adapter manages directory information of the data within the local cache memory. In response to a data-read request from the host, the channel adapter checks whether the read-data hits or not in the local cache memory based on the directory information. If the read-data hits, the read-data is transferred from the local cache memory to the host.

7 Claims, 12 Drawing Sheets

STORAGE SYSTEM AND DATA CACHING METHOD IN THE SYSTEM

CROSS-REFERENCES TO RELATED APPLICATIONS

This application relates to and claims priority from Japanese Patent Application No. 2003-396296, filed on Nov. 26, 2003, the entire disclosure of which is incorporated herein by reference.

BACKGROUND OF THE INVENTION

1. Field of the Invention

The present invention relates to a storage system such as a RAID disk array apparatus and, in particular, to the improvement in the data caching technology for increasing the speed of responses to data input/output requests from a host device.

2. Description of the Related Art

A storage system such as a RAID disk array apparatus includes, for example, multiple channel adapters, many storage devices, multiple storage adapters, a cache memory, and a connection network. The multiple channel adapters communicate commands and data to a host device. The storage devices, such as a hard disk drive, store data. The multiple storage adapters communicate commands and data to the storage devices. The cache memory temporarily stores data exchanged between the multiple channel adapters and storage adapters. The connection network connects the multiple channel adapters and storage adapters to the cache memory. The cache memory is connected to the channel adapters and storage adapters such that any of the channel adapters and storage adapters can access the cache memory. Even when the data read/write speed of the storage devices is low, the speed of the responses to data read/write requests from the host device can be more increased by using the cache memory.

Various kinds of architecture can be adopted for the connection network for connecting the multiple channel adapters to the cache memory in the storage system. For example, JP-A-2000-339101 (FIGS. 1 and 2 and paragraphs 0005 to 0006 and the like) discloses the one, which can be called hierarchical starnet architecture. In this case, multiple channel adapters and a cache memory are connected to a selector, and the selector switches multiple communication paths between the cache memory and the multiple channel adapters. Also, a crossbar switch architecture for connecting the cache memory and the multiple channel adapters through a crossbar switch and another crossbar switch architecture for connecting them through a common bus are known. Furthermore, a connection network is known in which each of multiple channel adapters is directly connected to a cache memory through a one-to-one dedicated connection line.

In the storage system, upon arrival of a data read/write request from the host device, the data to be read/written is read to the channel adapter through the connection network from the cache memory and is transferred to the host device therefrom or is written in the cache memory from the host device through the opposite path. Therefore, the channel adapter and the connection network are controlled from the arrival of the request from the host device. Therefore, the response of the storage system to the host device delays by the time required for transferring the data from the cache memory to a buffer within the channel adapter through the connection network (or for transferring the data through the opposite path).

SUMMARY OF THE INVENTION

Accordingly, it is an object of the invention to provide a new construction and control of a cache memory, which can more increase the responses of a storage system to data read/write requests from a host device.

According to one aspect of the invention, there is provided a storage system including multiple channel adapters each for performing data communication with one or more host devices, multiple storage devices for storing data, multiple storage adapters each for performing data communication with the multiple storage devices, a main cache memory for temporarily storing data exchanged between the multiple channel adapter and the multiple storage adapters, and a connection network for connecting the multiple channel adapters and the multiple storage adapters to the main cache memory. Each of the multiple channel adapters has a processor for controlling the data communication with the host devices, and a local cache memory for temporarily storing data accessed by the host devices. When the processor within each of the channel adapters receives write-data and a write-request with respect to the write-data from the host device, the write data is written in the local cache memory. Directory information for locating the storage area of the write-data in the storage device is stored. A response to the write-request is sent to the host device. The write-data is transferred from the local cache memory to the main cache memory through the connection network such that the write-data can be written in the storage device by the storage adapter.

In an embodiment of the invention, the processor may write the write-data in the local cache memory and stores the directory information of the write-data synchronous to a process from the receipt of the write-request to the transmission of the response to the host device. On the other hand, the processor may transfer the write-data from the local cache memory to the main cache memory by a back-write caching method asynchronous to the process from the receipt of the write-request to the transmission of the response to the host device. In this way, the caching method for writing write-data in the main cache memory asynchronous to the processing of data-write requests is called write-back caching processing method herein. On the other hand, the caching method for writing write-data in the main cache memory during the processing for write-requests, that is, synchronous to write-request processing is called write-through caching processing method herein.

In an embodiment of the invention, when the processor receives a read-request from the host device, the processor may check whether or not the read-data exists in the local cache memory based on the directory information stored by the processor. If the read-data exists in the local cache memory as a result of the check, the processor may send the read-data within the local cache memory to the host device. If the read-data does not exist in the local cache memory as a result of the check, the processor may read the read-data from the main cache memory through the connection network, write the read-data read from the main cache memory to the local cache memory, store directory information for locating the storage area of the read-data within the storage device, and send the read-data to the host device.

In an embodiment of the invention, each of the channel adapters has two or more of the processor, at least one of the local cache memory, and an internal bus for connecting the two or more processors and the at least one local cache memory and for allowing the faster data transmission than that of the connection network. In this case, each of the processors can directly access the at least one local cache memory through the internal bus within each of the channel adapters.

In an embodiment of the invention, the storage system may further include at least one channel adapter package. In this case, the two or more channel adapters may be mounted on the channel adapter package, and the two or more channel adapters may be connected to each other through the internal bus. In this case, on the channel adapter package, each of the processors within the two or more channel adapters can directly access not only the local cache memory within the same channel adapter but also the local cache memory within another channel adapter through the internal bus.

In an embodiment of the invention, the connection network may have a construction in accordance with a hierarchical starnet architecture.

In an embodiment of the invention, if the processor receives the write-request from the host device, the write-data may be duplexed and be written in the local cache memory.

In an embodiment of the invention, if the processor receives the write-request from the host device and if the write-request is intended for data remote copy, the write-data may be written in the local cache memory without duplexing.

In an embodiment of the invention, a storage area of the local cache memory preferably includes a cache area for host read/write and a cache area for remote copy. If the processor receives the write-request from the host device and if the write-request is intended for data remote copy, the write-data is written in the cache area for remote copy, and if not, the write-data may be written in the cache area for host read/write.

In an embodiment of the invention, a storage area of the local cache memory preferably includes a cache area for random access for storing data to be randomly accessed by the host device and a cache area for sequential access for storing data to be sequentially accessed. In this case, the processor variably controls the proportion of the cache area for random access and the cache area for sequential access in accordance with the frequency of performing the random access or the sequential access.

In an embodiment of the invention, the storage system may further include a shared memory shared by the multiple channel adapters. In this case, the shared memory may store exclusive control information relating to data within the local cache memory. In accessing data within the local cache memory, the processor within each of the channel adapters may use the exclusive control data within the shared memory so as to avoid the conflicts with accesses to same data by the other processors.

According to another aspect of the invention, there is provided a storage system including a channel adapter for performing data communication with a host device, a storage device for storing data, a storage adapter for performing data communication with the storage device, a main cache memory, which is connected to the channel adapter and the storage adapter, for temporarily storing data to be exchanged between the channel adapter and the storage adapter, and a local cache memory, which is provided within the channel adapter, for temporarily storing data to be accessed by the host device. When the channel adapter receives write data and a write request for the write data from the host device, the write-data may be written in the local cache memory. Directory information for locating a storage area of the write-data within the storage device may be stored. A response to the write-request may be sent to the host device.

The write-data may be transferred from the local cache memory to the main cache memory such that the write-data can be written in the storage device by the storage adapter.

According to the invention, the speed for processing data read/write requests from a host device can be more increased.

DESCRIPTION OF THE PREFERRED EMBODIMENTS

Figure 1:
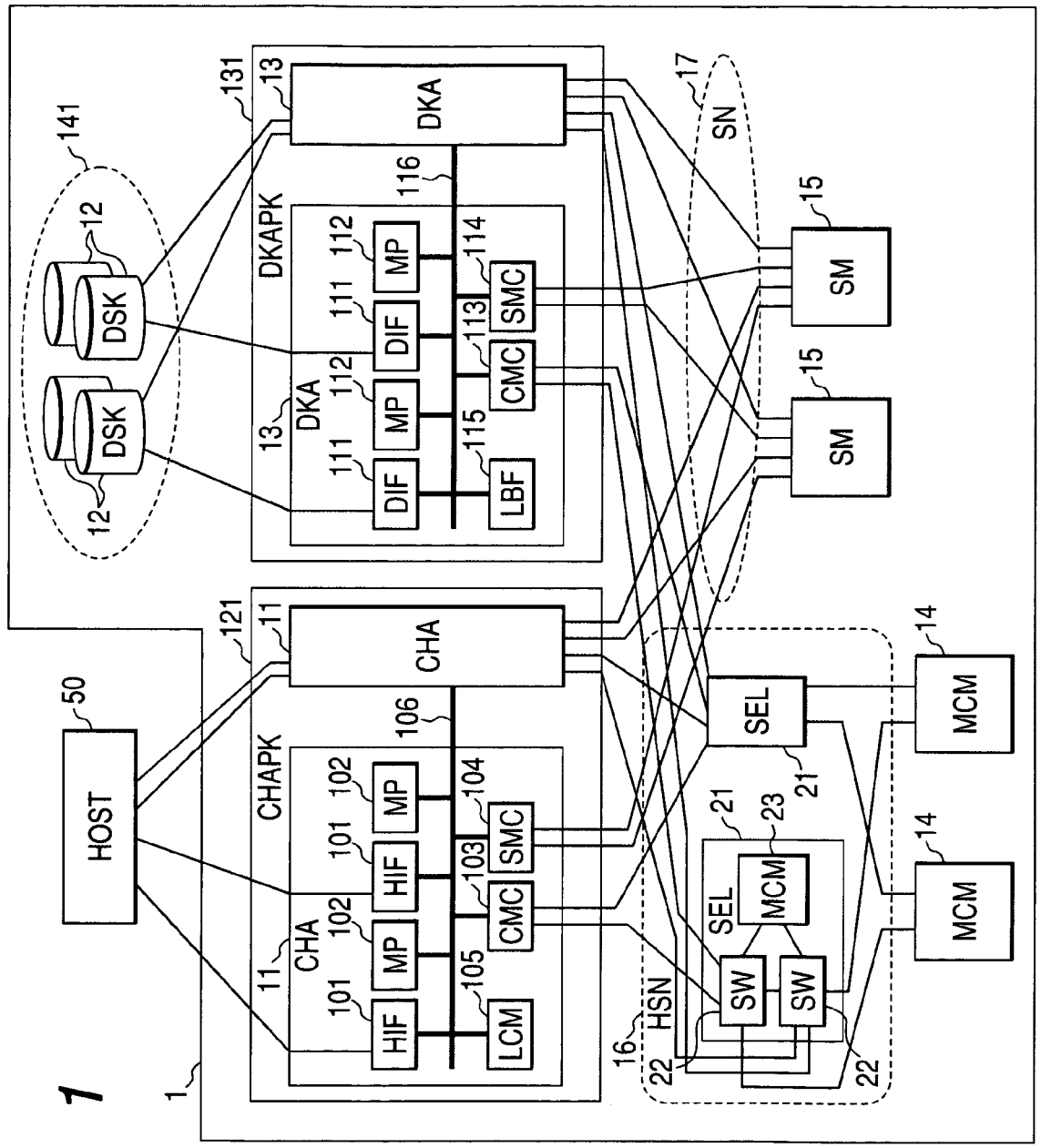
FIG. 1 is a block diagram showing an entire basic construction of an embodiment of a storage system, especially a RAID disk array apparatus, according to the invention.

FIG. 1 shows an entire basic construction of an embodiment of a storage system, especially a RAID disk array apparatus, according to the invention.

As shown in FIG. 1, a disk array control apparatus 1 includes multiple channel adapters (CHA) 11, many storage devices (such as hard disk drives) (DSK) 12, multiple disk adapters (DKA) 13, multiple main cache memories (MCM) 14, and multiple shared memories (SM) 15. Each of the channel adapters (CHA) 11 performs data communication with one or more host computers (HOST) 50. Each of the disk adapters (DKA) 13 performs data communication with the disk drives (DSK) 12. The main cache memories (MCM) 14 temporarily store data to be exchanged between the channel adapters (CHA) 11 and the disk adapters (DKA) 13. The shared memories (SM) 15 store information for control and/or management to be used by the channel adapters (CHA) 11 and the disk adapters (DKA) 13. Under the control of the channel adapters (CHA) 11 and the disk adapters (DKA) 13, the many disk drives (DSK) 12 are included in a disk array 141 in accordance with the RAID principle.

The disk array control apparatus 1 further includes a connection network 16 for controlling the communication connections between the multiple channel adapters (CHA) 11 and the multiple main cache memories (MCM) 14 and the communication connections between the multiple disk adapters (DKA) 13 and the multiple main cache memories (MCM) 14. The connection network 16 has a construction in accordance with a hierarchical starnet architecture, for example, and will be called hierarchical starnet (HSN). The hierarchical starnet (HSN) 16 has multiple selectors (SEL) 21. Each of the selectors (SEL) 21 is connected to the multiple channel adapters (CHA) 11, the multiple main cache memories (MCM) 14, and the multiple disk adapters (DKA) 13. Each of the selectors (SEL) 21 has mutually connected multiple switches (SW) 22. Through the switch (SW) 22, communication paths are established between one channel adapter (CHA) 11 selected from the multiple channel adapters (CHA) 11 and one main cache memory (MCM) 14 selected from the multiple main cache memories (MCM) 14. Furthermore, through the switch (SW) 22, a communication path is established between one disk adapter (DKA) 13 selected from the multiple disk adapters (DSK) 13 and one main cache memory (MCM) 14 selected from the multiple main cache memories (MCM) 14. Because of the existence of the multiple selectors (SEL) 21, multiple communication paths can be simultaneously established between the multiple channel adapters (CHA) 11 and the multiple main cache memories (MCM) 14. Furthermore, because of the existence of the multiple selectors (SEL) 21, multiple communication paths can be simultaneously established between the multiple disk adapters (DKA) 13 and the multiple main cache memories (MCM) 14. Each of the selectors (SEL) 21 contains additional main cache memory (MCM) 23 inside. Because of the switches (SW) 22, the additional main cache memory (MCM) 23 can be also selected like the main cache memory (MCM) 14 outside of the selectors (SEL) 21 and can be connected to the selected channel adapter (CHA) 11 and the selected disk adapter (DKA) 13. Thus, the additional main cache memory (MCM) 23 can be used for the same purposes as those of the main cache memories (MCM) 14.

The disk array control apparatus 1 further includes a connection network 17 for controlling the communication connection between the multiple channel adapters (CHA) 11 and the multiple shared memories (SM) 15 and the communication connection between the multiple disk adapters (DKA) 13 and the multiple shared memories (SM) 15. The connection network 17 has a construction compliant with a starnet architecture, for example, and will be called starnet (SN) hereinafter. The starnet (SN) 17 has multiple dedicated communication lines for implementing the point-to-point connection between each of the channel adapters (DKA) 11 and each of the shared memories (SM) 15 and multiple dedicated communication line for implementing the point-to-point connection between each of the disk adapters (DKA) 13 and each of the shared memories (SM) 15.

In FIG. 1, the numbers of the channel adapters (CHA) 11, the disk adapters (DKA) 13, the main cache memories (MCM) 14, the shared memories (SM) 15 and the selectors (SEL) are two. However, this is just an example for clearer illustration. The numbers may be higher, or rather, more disk array apparatus are commonly provided.

As shown in FIG. 1, each of the channel adapters (CHA) 11 has one or more host interfaces (HIF) 101, one or more microprocessors (MP) 102, a cache memory controller (CMC) 103, a shared memory controller (SMC) 104, and a local cache memory (LCM) 105. Each of the host interfaces (HIF) 101 functions as a communication interface with the host computer (HOST) 50. Each of the microprocessors (MP) 102 controls data communication with the host computer (HOST) 50. The cache memory controller (CMC) 103 controls data communication with the main cache memory (MCM) 14 through the hierarchical starnet (HSN) 16. The shared memory controller (SMC) 104 controls communication with the shared memories through the starnet (SN) 17. The local cache memory (LCM) 105 temporarily stores data to be exchanged with the host computer (HOST) 50. The components such as the host interfaces 101 within the channel adapters (CHA) 11, the microprocessors (MP) 102, the cache memory controllers (CMC) 103, the shared memory controllers (SMC) 104, and the local cache memories (LCM) 105 are connected through an internal bus 106 so as to allow the direct communication. The internal bus 106 is a fast bus compliant with PCI standard, for example, and the communication speed is apparently higher than the communication speed of the hierarchical starnet (HSN) 16 and starnet (SN) 17. A predetermined number (which is two in the example in FIG. 1 but may be other numbers) of channel adapters (CHA) 11 having the above-described construction are implemented on one channel adapter package (typically, one circuit board) (CHAPK) 121. The different channel adapters (CHA) 11 on the same package (CHAPK) 12 are connected through the fast internal bus 106. Therefore, the communication between the different channel adapters (CHA) 11 on the same package (CHAPK) 121 can be implemented fast and directly through the internal bus 106 like the communication within the channel adapters (CHA) 11. According to this embodiment, as described later in detail, the local cache memory (LCM) 105 connected with the host interfaces (HIF) 101 and microprocessors (MP) 102 on the channel adapter package (CHAPK) 121 through the internal bus 106 may be used as a support or alternative unit for the main cache memory (MCM) 14 in accordance with the principle of the invention. As a result, the response speed of the disk array apparatus 1 to the data read/write requests from the host computer (HOST) 50 can be higher than was previously possible.

As shown in FIG. 1, each of the disk adapters (DKA) 13 has one or more disk interfaces (DIF) 111, one or more microprocessors (MP) 112, a cache memory controller (CMC) 113, a shared memory controller (SMC) 114 and a local buffer memory (LBF) 115. Each of the disk interfaces (DIF) 111 functions as a communication interface with the disk drive (DSK) 12. Each of the microprocessors (MP) 112 controls the data communication with the disk drives (DSK) 12. The cache memory controller (CMC) 113 controls the data communication with the main cache memory (MCM) 14. The shared memory controller (SMC) 114 controls the communication with the shared memories (SM) 15 through the starnet (SN) 17. The local buffer memory (LBF) 115 temporarily stores data to be exchanged with the disk drives (DSK) 12. The components such as the disk interfaces (DIF) 111 within the disk adapters 13, the microprocessors (MP) 112, the cache memory controller (CMC) 113, the shared memory controller (SMC) 114 and the local buffer memory (LBM) 115 are connected through an internal bus 116 (which is the same PCI bus as the internal bus 106 of the channel adapters (CHA) 11, for example) so as to allow the direct communication. A predetermined number (which is two in the example in FIG. 1 but may be other numbers) of disk adapters (DHA) 13 having the above-described construction are implemented on one disk adapter package (typically, one circuit board) (DKAPK) 131. The different disk adapters (DKA) 13 on the same package (DKAPK) 131 are connected with each other through the internal bus 116. Therefore, the communication between the different disk adapters (DKA) 13 on the same package (DKAPK) 131 can be implemented fast through the internal bus 116 like the communication within the disk adapters (DKA) 13.

Figure 2:
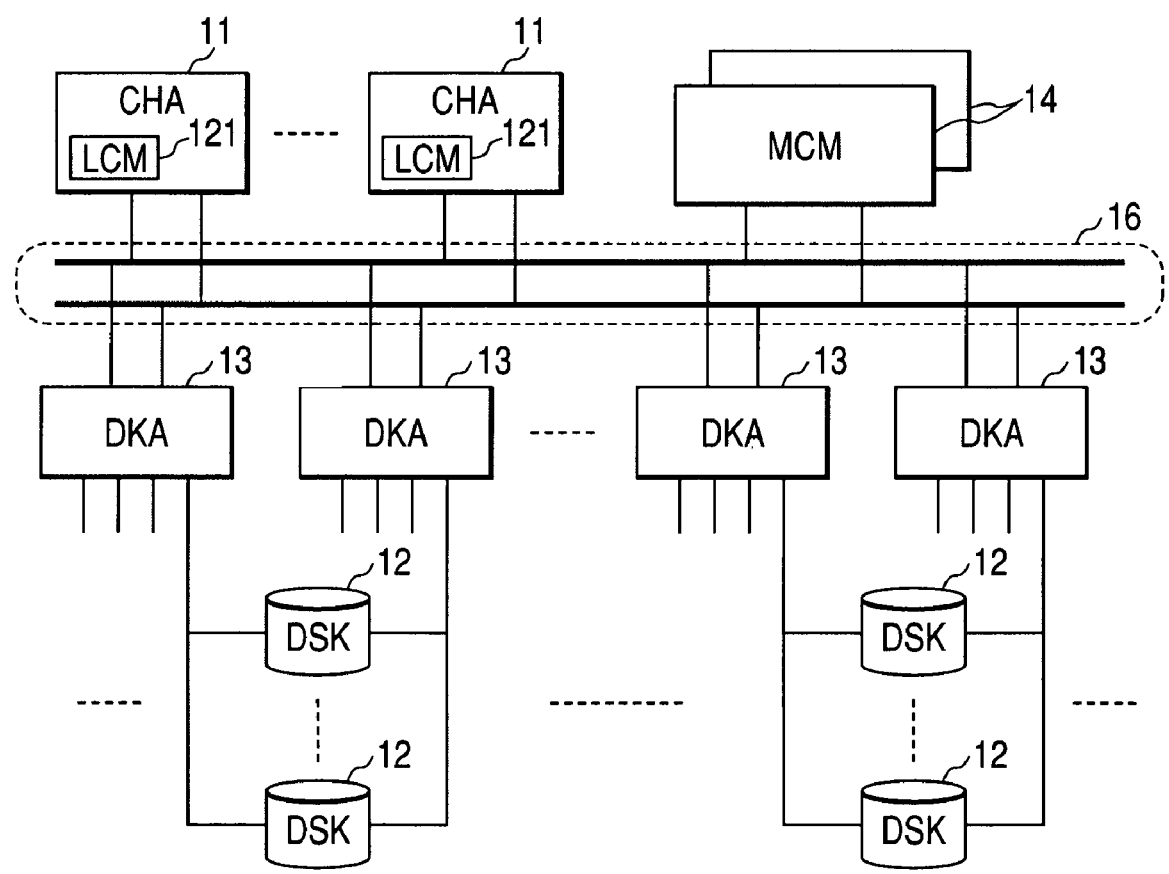
FIG. 2 is a block diagram showing a variation example of a connection network 16 between channel adapters 11 and a main cache memory 14.
Figure 3:
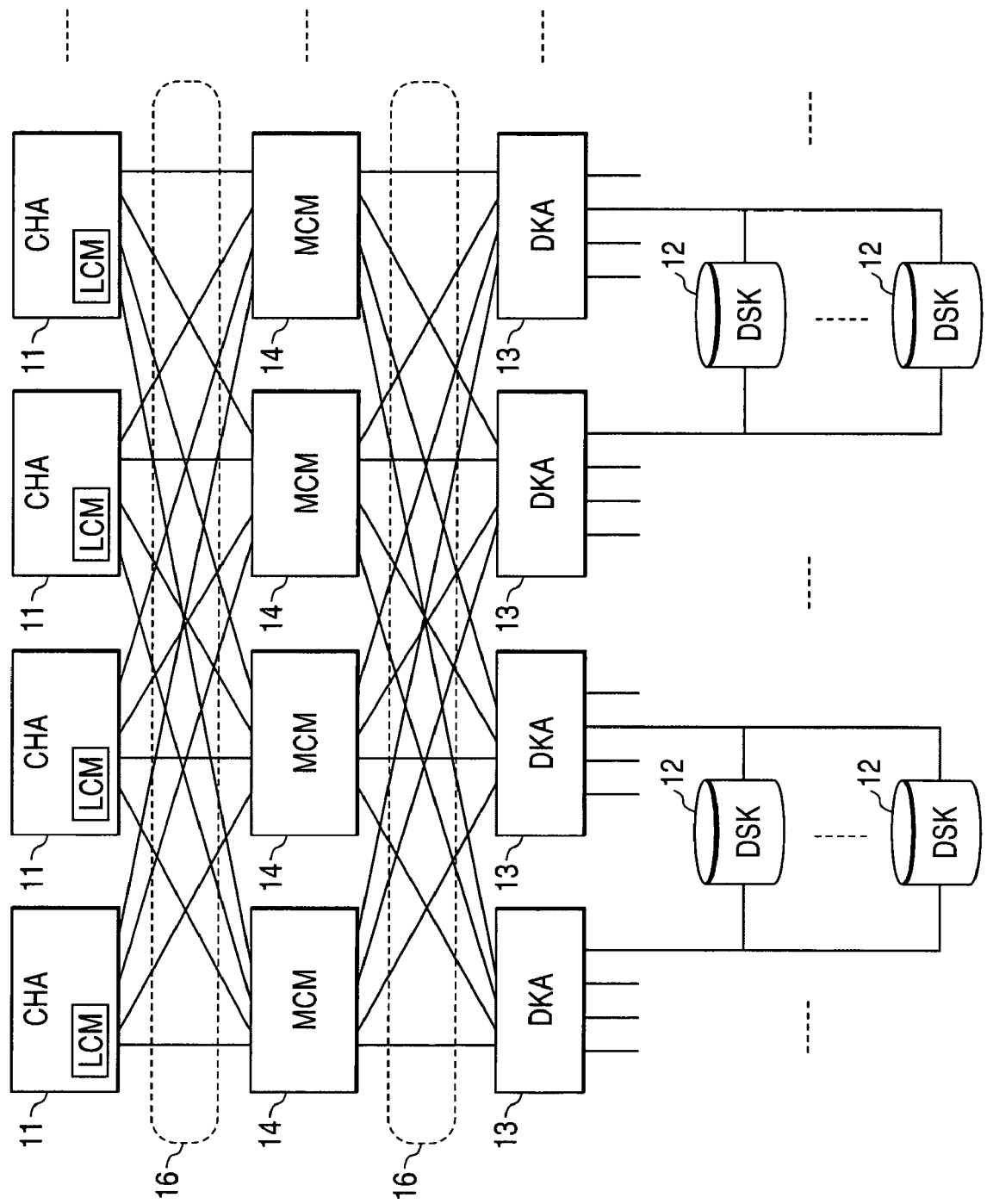
FIG. 3 is a block diagram showing another variation example of the connection networks 16 between the channel adapters 11 and the main cache memories 14.

By the way, the construction shown in FIG. 1 is just an example, and other various constructions can realize the invention. For example, instead of the hierarchical starnet (HSN) using the selectors (SEL) 22 having the additional main cache memory 23 illustrated in FIG. 1, the construction of the connection network 16 for connecting the channel adapters (CHA) 11, the main cache memories (MCM) 14 and the disk adapters (DKA) 13 may be a hierarchical starnet using a selector without an additional main cache memory, a common bus construction for the connection through the crossbar switches as illustrated in FIG. 2, or a construction for connecting the individual channel adapters 11, the cache memories 14 and the individual disk adapters 13 through the point-to-point dedicated communication lines as illustrated in FIG. 3.

With any construction of the connection network 16, according to this embodiment, the multiple memories (LBM) 105 provided to the multiple channel adapters (CHA) 11 for controlling the communication with the host computer (HOST) 50 is used as distributed local cache memories (LCM). Data having higher possibilities to be used by the host computer (HOST) 50 are stored in the local cache memories (LCM) 105.

As is apparent from the operation descriptions below, when a data read request comes from the host computer 50, and if the data to be read (called read data hereinafter) exists in the local cache memory 105 (in a case of READ-HIT), the channel adapter 11 does not access the main cache memory 14 through the low-speed connection network 16. The channel adapter 11 reads the read-data from the fast accessible local cache memory 105 and transfers the data to the host computer 50. On the other hand, if the read data does not exist in the local cache memory 105 (in a case of READ-MISS), the channel adapter 11 reads the read-data from the low-speed main cache memory 14 (or from the disk drive 12 through the main cache memory 14). The data read to the channel adapter 11 is transferred to the host computer 50 through the local cache memory 105 (that is, after the data is written to the local cache memory 105).

When new data needs to be written in the local cache memory 105 but the local cache memory 105 from the host computer 50 is full, the oldest cache data therein is deleted. Then, the new data is written in the local cache memory 105. Therefore, data are stored in the local cache memory 105 for a certain period of time. Even when the data does not exist on the main cache memory 14, the read request to the data from the host computer 50 can be immediately responded if the data is stored in the local cache memory 105. In this sense, the local cache memory 105 functions as not only the support but also alternative units of the main cache memory 14. Thus, the effective uses of the main cache memory 14 are promoted.

Each of the microprocessors 102 can directly access any of the multiple local cache memories 105 through the internal bus 106 among the multiple channel adapters 11 implemented on the same channel adapter package 121. In other words, the multiple microprocessors 102 share the multiple local cache memories 105 on the same channel adapter package 121. The multiple microprocessor 102 store and manage in a distributed manner the directory information (or the information locating the logical or physical storage area of given data within the disk array 141) of the cache data within the multiple local cache memories 105 shared by the multiple microprocessors 102. For example, each of the microprocessors 102 stores and manages in a distributed manner the directory information of the cache data previously processed by the microprocessor 102. The directory information is managed in cache slot, for example. It is noted that each of the microprocessors 102 logically divides the storage area (of 256 MB, for example) of each of the local cache memories 105 into many cache pages (of 256 kB, for example). Each of the cache pages is logically divided into many cache slots (of 4 kB, 16 kB or 24 k, for example) for management. One of the microprocessors 102 searches read data from the local cache memories 105 by searching the read data from the directory information managed by the microprocessor 102 itself first. If nothing hits as a result of the search, the inquiries are made to the other microprocessors 102 on the same channel adapter package 121 so that the read data can be searched from the directory information managed by the other microprocessors 102. Thus, each of the microprocessors 102 can search read data from all of the local cache memories 105 on the same channel adapter package 121. If the read-data is found as a result, the read data can be read from the corresponding local cache memory 105 and be transferred to the host computer 50. In this way, if read-data being searched exists in any of the local cache memories 105 on the same channel adapter package 121, the microprocessor 102 does not have to access the main cache memory 14 but can obtain the read data from the faster local cache memory 105 and transfer the obtained read-data to the host computer 50.

When a data-write request comes from the host computer 50, the channel adapter 11 writes the data to be written (called write-data hereinafter) in proper one of the local cache memories 105 on the same channel adapter package 121. Then, before transferring the data to the main cache memory 14, the channel adapter 11 can send the write-completion response to the host computer 50. In this case, in general, the write-data is duplexed and is written in the local cache memory 105 (that is, both of the write data and the copy data are written in the local cache memory 105) in order to reduce the risk of data lost when a failure occurs. However, when the remote copy of data is performed (that is, when data is written in the disk array apparatus 1 connected to the master host computer 50 and the same write data is also transferred to the disk array apparatus 1 connected to the remote host computer 50 and is written therein for data duplexing), the write-data is duplexed and is written in the local cache memory 105 in the disk array apparatus 1 connected to the master host computer 50. However, the write data is written in the local cache memory 105 without duplexing in the disk array apparatus 1 connected to the remote host computer 50. Since the original write data is stored in the master disk array apparatus 1, the same data can be sent again from the master side to the remote side even when the write data is lost due to a failure in the remote side. Apparently, the dual-caching to the local cache memory 105 may be performed in the remote side.

When the write data is written in the local cache memory 105, the thread (which is a processing unit of a process of the microprocessor 102) for processing a data-write request within the channel adapter 11 can return a write-completion response to the host computer 50 immediately and go to the next processing. In this case, a transfer-ready response indicating that the write-data has been written in the main cache memory 14 does not have to be waited. The write-data written in the local cache memory 105 is transferred to and is written in the main cache memory 14 asynchronous to and later than the data-write request process in accordance with the write-back caching processing method. Even when the write-back caching processing method is adopted, the risk of data-lost is cancelled by the dual-caching to the local memory 105. In the write-back caching processing method, unlike the write-through caching processing method (in which write-data is written in the main cache memory 14 during the processing for a write request from the host computer 50 (that is, synchronous to the request processing)), the write data does not have to be immediately transferred from the host computer 50 to the low-speed main cache memory 14. Then, all of the multiple pieces of write data within the local cache memory 105 can be transferred to the main cache memory 14 until the local cache memory 105 becomes full or until data is overwritten in the local cache memory 105 or in other predetermined timing. Thus, the number of times of processing for data-writing to the low-speed main cache memory 14 can be reduced.

The area of the local cache memory 105 may be divided into multiple sub-areas, and the sub-areas can be assigned to cache data to be used differently. For example, cache data may be used differently in accordance with the selected host connection method. The typical examples of the different uses are host read/write (data read/write processing requested from the normal host computer 50 or the master host computer 50) and remote copy (data-write (copy) processing requested from the remote host computer 50). One of the sub-areas of the local cache memories 105 may be assigned to the data caching for host read/write while another sub-area may be assigned for remote copy.

Operations of the disk-array apparatus 1 according to this embodiment will be described below. The description below may apply not only to the construction shown in FIG. 1 but also to the disk array apparatus 1 having the constructions shown in FIGS. 2 and 3.

Figure 4:
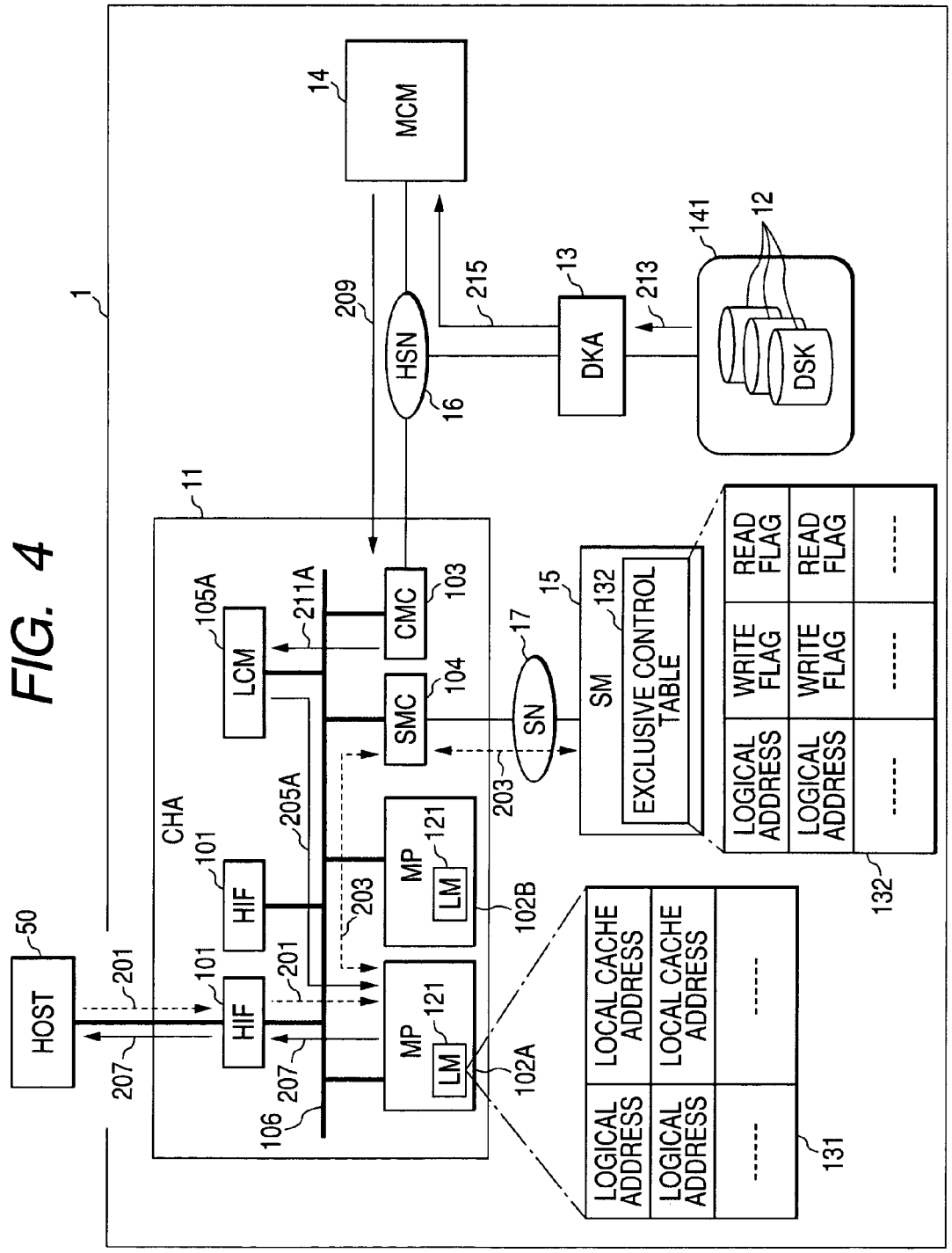
FIG. 4 is a diagram showing a command and data flow within a disk array apparatus 1 upon arrival of a data read request from a host computer 50.
Figure 5:
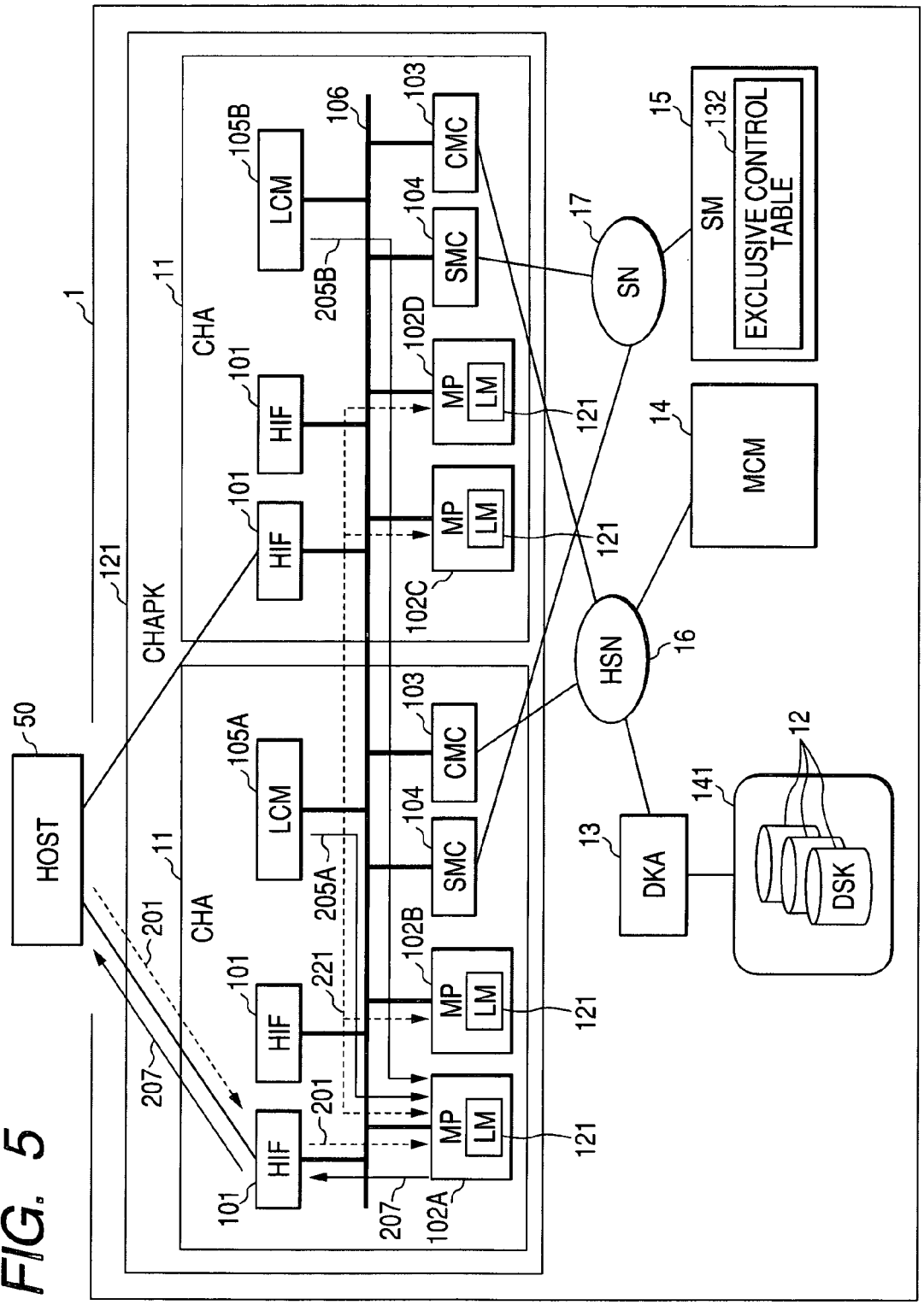
FIG. 5 is a diagram showing a command and data flow within the disk array apparatus 1 in the case.
Figure 6:
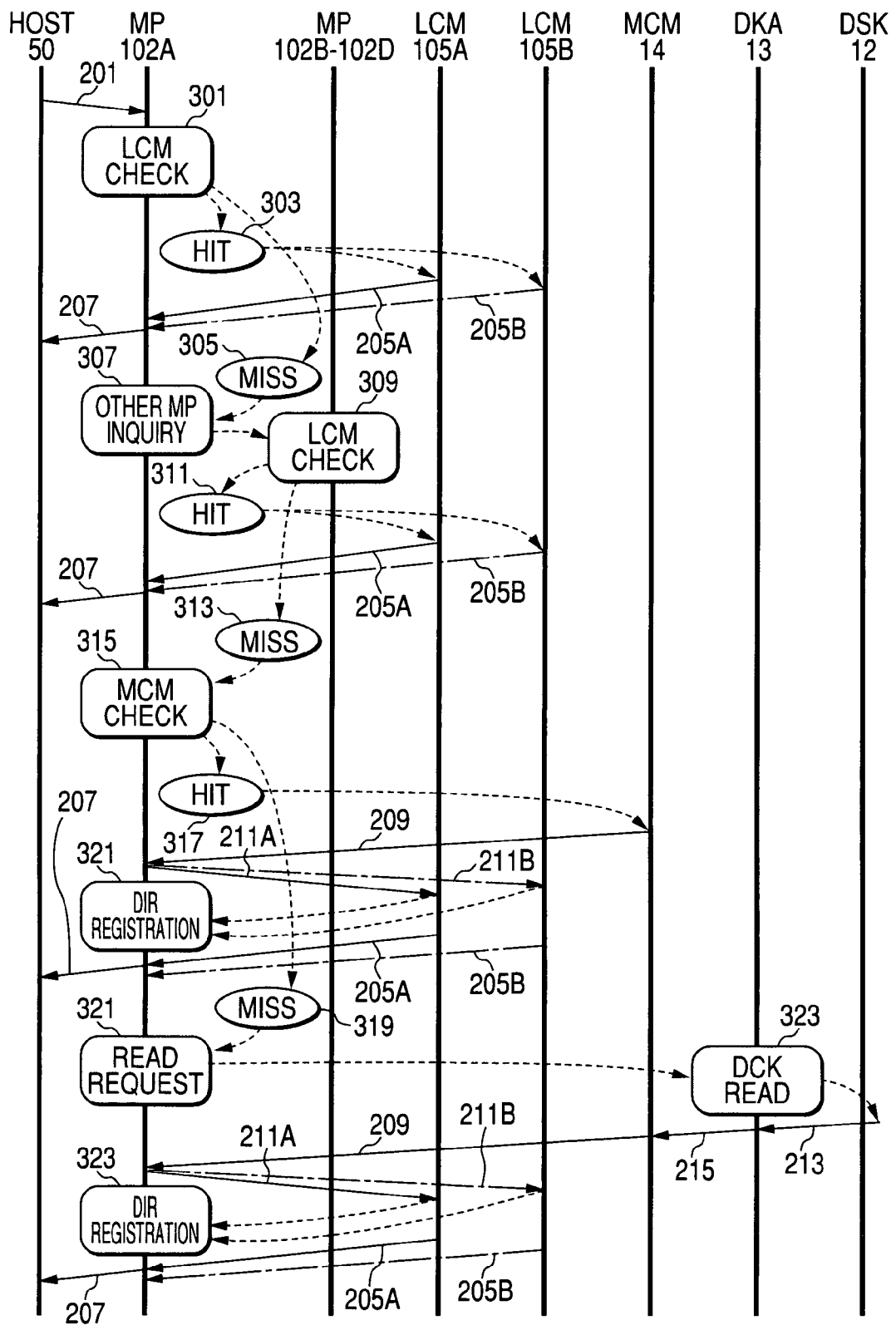
FIG. 6 is a diagram showing operation sequences of components in the disk array device 1 in the case.

FIGS. 4 and 5 show a command and data flow within the disk array apparatus 1 when a data-read request comes from the host computer 50. FIG. 6 shows operational sequences of the components within the disk array apparatus 1 in the case. Referring to FIGS. 4 to 6, an operation of the disk array apparatus 1 will be described where a data read request comes from the host computer 50.

First of all, referring to FIGS. 4 and 6, a data-read request (arrow 201) from the host computer 50 is input to a given one (which will be called microprocessor 102A below) of microprocessors 102 through the host interface 101 within one of the channel adapters 11. The microprocessor 102A checks whether or not the requested read-data is cached in one of the local cache memories 105 of the same channel adapter package 121 (which will be called local cache memory (LCM) check, hereinafter). In order to perform the LCM check, the microprocessor 102A refers to the directory information 131 of the cache data stored in the local cache memory 121 within the microprocessor 102A first and searches the read-data from the directory information 131 ("LCM CHECK" 301 in FIG. 6). The directory information 131 managed by the microprocessor 102A itself records the directory information of the cache data written by the microprocessor 102A itself in the entire cache data stored in the local cache memories 105 on the same channel adapter package 121. In this case, the directory information may be logical addresses of storage areas of the cache data within the disk array 141 and the addresses of storage areas within the local cache memories 105 (local cache addresses). At the "LCM CHECK" 301, for example, read-data can be searched by comparing the logical address of the cache data recorded in the directory information 131 and the logical address of the read-data included in the read request from the host computer 50.

If the read-data is found ("HIT" 303 in FIG. 6) in the directory information 131 managed by the microprocessor 102A itself at the "LCM CHECK" 301, the microprocessor 102A reads the read-data from the storage area within the local cache memory 105 specified by the local cache address of the read-data recorded in the directory information 131. In this case, if the storage area specified by the local cache address exists within the local cache memory 105A within the same channel adapter 11, the microprocessor 102A reads the read-data from the local cache memory 105A as indicated by an arrow 105A in FIG. 4. If the storage area exists within another one (which will be called local cache memory 105B) of the local cache memories 105 within another one of the channel adapters 11, the microprocessor 102A reads the read-data from the local cache memory 105B within the channel adapter 11 as indicated by an arrow 205B in FIG. 5. In both cases, the microprocessor 102A can obtain read-data fast through the internal bus 106.

In order to read read-data from the local cache memory 105A or 105B, the microprocessor 102A refers to an exclusive control table 132 stored in the shared memory 15 as indicated by an arrow 203 in FIG. 4. The exclusive control table 132 records exclusive control information, for avoiding the conflicts among multiple accesses, with respect to the logical addresses of all data within the disk array apparatus 1. (The exclusive control information may be a write-flag and read-flag indicating whether any write/read process is performed on each of the logical addresses or not). By referring to the exclusive control table 132, the microprocessor 102A may read read-data only when no write-processes are performed on the read-data, for example, and may read the read-data from the local cache memory 105A or 105B when the access of the microprocessor 102A does not conflict with other exclusive accesses. Furthermore, while reading the read-data, a read-flag may be "in reading",for example, so as to control such that no write processes are performed on the read-data.

In this way, after reading the read-data from the local cache memory 105A or 105B, the microprocessor 102A sends the read-data to the host computer 50 through the host interface 101 (arrow 207).

On the other hand, if the read-data is not found ("MISS" 305 in FIG. 6) in the directory information 131 managed by the microprocessor 102A itself at the "LCM CHECK" 301, the microprocessor 102A inquires of the other microprocessors 102B to 102D within the same channel adapter package 121 about the read-data ("OTHER MP INQUIRY" 307 in FIG. 6), as indicated by an arrow 221 in FIG. 5. Then, each of the other microprocessors 102B to 102D searches the read-data from the directory information 131 stored in the local cache memory 121 (the directory information of the cache data written by the microprocessors 102B to 102D in the local cache memory 105A or 105B) ("LCM CHECK" 309 in FIG. 6). Then, each of the other microprocessors 102B to 102D returns the answer (for example, if HIT, the local cache address of the read-data while, if MISS, the fact) to the microprocessor 102A. When the microprocessor 102A obtains the local cache address of the read data from the answer from one of the other microprocessors 102B to 102D ("HIT" 311 in FIG. 6), the microprocessor 102A reads the read-data from the storage area within the local cache memory 105A or 105B specified by the local cache address (arrows 205A and 205B). The exclusive control is certainly performed here. Then, the microprocessor 102A sends the read read-data to the host computer 50 (arrow 207).

If all of the responses to the "LCM CHECK" 309 by the other microprocessors 102B to 102D result in misses ("MISS" 313 in FIG. 6), it means that the read-data is not cached on the local cache memories 121 on the same channel adapter package 121 as that of the microprocessor 102A. In this case, the microprocessor 102A checks whether the read-data exists in the main cache memory 14 or not ("MCM CHECK" in FIG. 6). If the read-data is found therein as a result ("HIT" 317 in FIG. 6), the read-data is read from the main cache memory 14 as indicated by an arrow 209 in FIG. 4. Then, as indicated by an arrow 211A in FIG. 4 or an arrow 211B in FIG. 6, the read-data is written in a storage area under a proper empty address within the local cache memory 105A or 105B (if no empty addresses are available, the oldest cache data in the local cache memory 105A or 105B is removed. Then, the read-data is written therein). Furthermore, the microprocessor 102A additionally registers the directory information such as the logical address and local cache address of the read-data with the directory information 131 within the microprocessor 102A ("DIR REGISTRATION" 321 in FIG. 6). Then, the microprocessor 102A reads the read-data from the local cache memory 105A or 105B (arrows 205A or 205B), and the read-data is sent to the host computer 50 (arrow 207).

If the read-data is not found there as a result of the "MCM CHECK" 315 ("MISS" 319 in FIG. 6), the microprocessor 102A requests reading the read-data from the disk array 141 to the disk adapter 13 ("READ REQUEST" 321 in FIG. 6). The disk adapter 13 reads the read-data from the disk array 141 and writes the data in the main cache memory 14, as indicated by arrows 213 and 215 in FIG. 4. The microprocessor 102A reads the read-data from the main cache memory 14 and stores the read-data in the local cache memory 105A or 105B in the above-described manner. Then, the directory information is additionally registered, and the read data is sent to the host computer.

This is the operation of the data-read process. Next, an operation of the disk array apparatus 1 will be described where a data-write request comes from the host computer 50.

Figure 7:
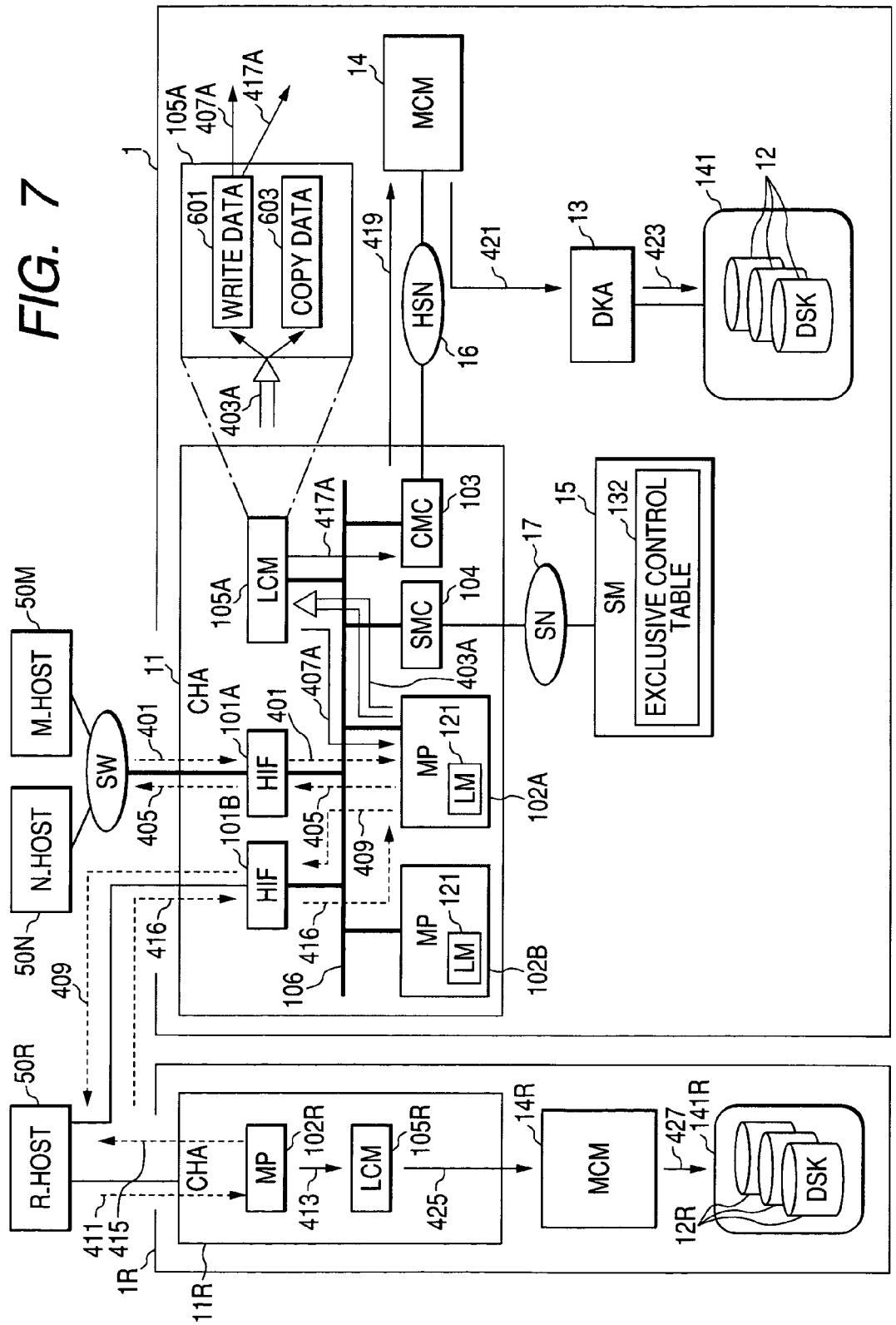
FIG. 7 is a diagram showing a command and data flow within the disk array apparatus 1 upon arrival of data write request from the host computer 50.
Figure 8:
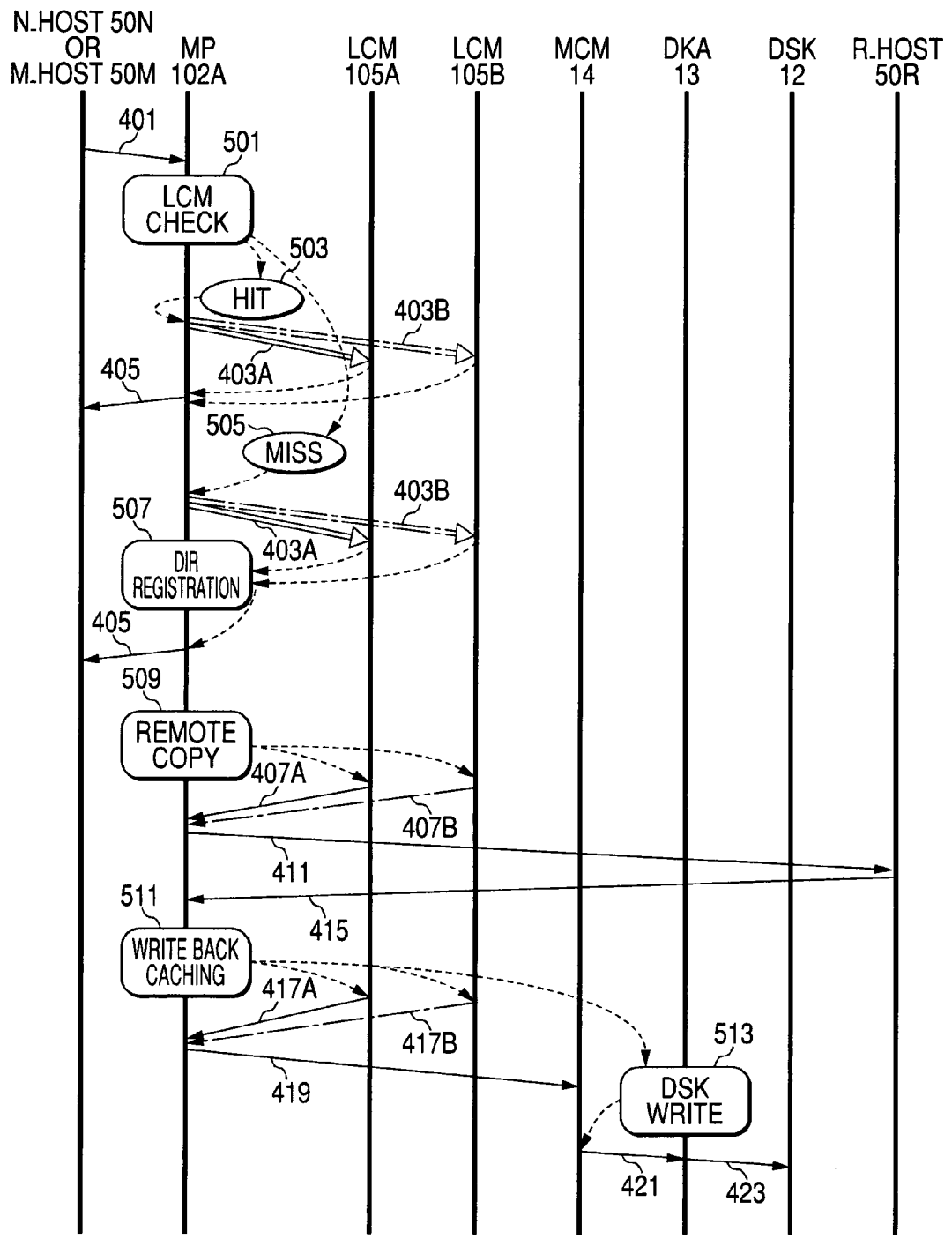
FIG. 8 is a diagram showing operation sequences of the components in the disk array apparatus 1 in the same case.

FIG. 7 shows a command and data flow in the disk array apparatus 1 in this case. FIG. 8 shows operational sequences of the components in the disk array apparatus 1 in this case.

When a data-write request comes, the operation of the disk array apparatus 1 depends on the type of the host computer 50 having sent the data-write request. In the description below, the host computer 50 is categorized into three types including a normal host computer (that is, a host computer issuing data-write requests, which do not require remote copies) (N_HOST) 50N, a master host computer (that is, a host computer issuing data-write requests, which require remote copies) (M_HOST) 50M, and a remote host computer (that is, a host computer issuing write requests for remote copy) (R_HOST) 50R.

In the system example shown in FIG. 7, one disk array apparatus (which will be called main disk array apparatus, hereinafter) 1 is connected to the normal host computer (N_HOST) 50N or the master host computer (M_HOST) 50M. Another disk array apparatus for remote copy (which will be called sub disk array apparatus, hereinafter) 1R is connected to the remote host computer (R_HOST) 50R. The main disk array apparatus 1 is also connected to the remote host computer 50R. A data-write operation in the system configuration shown in FIG. 7 will be described below.

However, those skilled in the art should easily understand from the following description how the principle of the invention is applied to other system configurations.

Referring to FIGS. 7 and 8, a data-write request including write-data from the normal host computer 50N or master host computer 50M is received by the microprocessor 102A within one of the channel adapters 11 in the main disk array apparatus 1, as indicated by an arrow 401. The microprocessor 102A checks whether or not the write-data is cached in either local cache memory 105A or 105B on the same channel adapter package 121 ("LCM CHECK" 501 in FIG. 8). At the "LCM CHECK" 501, the microprocessor 102A refers to the directory information 131 of the cache data stored in the local cache memory 121 within the microprocessor 102A and searches the write-data from the directory information 131. If the write-data is found as a result ("HIT" 503 in FIG. 8), the microprocessor 102A writes the write-data received from the host computer 50N or 50M in the storage area within the local cache memory 105A or 105B (the local cache memory 105B is omitted in FIG. 7) specified by the local cache address of the write data recorded in the directory information 131 (arrow 403A or 403B). (In other words, new write-data is overwritten on old write-data within the local cache memory 105A or 105B). In this case, the microprocessor 102A duplexes and writes the write-data in the local cache memory 105A or 105B. In other words, as shown in FIG. 7, the write-data 601 and the copy data 603 thereof are written in different addresses within the local cache memory 105A or 105B.

The local cache memory 105A or 105B writes the write-data in the local cache memory 105A or 105B only when no write and read operations are performed on the write-data, for example, as a result of the reference to the exclusive control table 132 within the shared memory 15 (which is omitted in FIG. 7). In this way, a write-process is performed at the time when the write-process does not conflict with other accesses. Furthermore, during the write-process, other read/write processes are controlled not to be performed simultaneously by setting the write flag at "in writing".

After writing the write-data in the local cache memory 105A or 105B in this way, the microprocessor 102A immediately sends a write-completion response to the host computer 50 through the host interface 101 (arrow 405) without waiting for a transfer-ready response meaning that the write-data has been written in the main cache memory 14.

On the other hand, if the write-data is not found (MISS" 505 in FIG. 8) in the directory information 131 managed by the microprocessor 102A at the "LCM CHECK" 301, the microprocessor 102A itself writes the write-data at the storage area under a proper empty address within the local cache memory 105A or 105B (arrow 403A or 403B). (If no empty addresses are available, the oldest cache data within the local cache memory 105A or 105B is deleted. Then, the write data is written therein). Also in this case, the write data is duplexed and is written therein. The exclusive control is also performed thereon. Furthermore, the microprocessor 102A additionally registers the directory information such as the logical address and local cache address of the write data with the directory information 131 within the microprocessor 102A ("DIR REGISTRATION" 507 in FIG. 8). Then, the microprocessor 102A sends the write-completion response to the host computer 50 through the host interface 101 (arrow 405).

Alternatively, if the write-data is not found in the directory information 131 managed by the microprocessor 102A at the "LCM CHECK" 301, the microprocessor 102A itself inquires of the other microprocessors 102B to 102D within the same channel adapter package 121 in the same manner as that of the data-reading (not shown in FIGS. 7 and 8). Then, the write-data is searched through the directory information managed by the other microprocessors 102B to 102D. If HIT, the write data is duplexed and is overwritten in the local cache memory 105A or 105B like the case of "HIT" 503 in FIG. 8. If all of the responses are misses, the write-data may be duplexed and be additionally written in the local cache memory 105A or 105B like the case of "MISS" 505 in FIG. 8.

A remote copy process is not necessary for a data-write request received from the normal host computer 50N. However, when a data-write request is received from the master host computer 50M, a remote-copy processing is performed on the write-data ("REMOTE COPY" 509 in FIG. 8) in proper timing (which may be before or after write-back caching, which will be described later, while the timing is after the write-back caching in FIG. 8) after the write-data is cached in the local cache memory 105A or 105B. In other words, the microprocessor 102A reads the write-data from the local cache memory 105A or 105B (arrow 407A or 407B). Then, a remote copy request including the write-data is sent to the remote host computer 50R through the host interface 101B (arrow 409). The remote host computer 50R sends a write-request for the write-data to the sub disk array apparatus 1R (arrow 411). The microprocessor 102R within the channel adapter 11R within the sub disk array apparatus 1R writes the write-data to be remotely copied to the local cache memory 105R (arrow 413 in FIG. 7) by following the same steps as the processing steps for the main disk array apparatus 1. However, the write-data is not duplexed here (but may be duplexed, of course). The microprocessor 102R of the sub disk array apparatus 1R stores the write-data in the local cache memory 105R. The microprocessor 102R, then, immediately returns the write-completion response to the remote host computer 50R (arrow 415 in FIG. 7) without waiting for a transfer-ready response meaning that the write-data has been written in the main cache memory 14R. In response to the write-completion response, the remote host computer 50R sends the remote-copy completion response to the main disk array apparatus 1 (arrow 416). Then, the microprocessor 102A receives the response in the memory disk array apparatus 1.

The microprocessor 102A of the main disk array apparatus 1 performs the write-back caching ("WRITE BACK CACHING" 511) in predetermined timing asynchronous to the processing for data-write requests from the host computer 50N or 50M (for example, when the local cache memory 105A or 105B becomes full, when the data cached in the local cache memory 105A or 105B is updated in the later write-process or in other timing). In other words, the microprocessor 102A reads all of the write-data stored in the local cache memory 105A or 105B once (arrow 417A or 417B). Then, the microprocessor 102A transfers the write-data to the main cache memory 14 and writes therein (arrow 419). Then, the microprocessor 102A requests the disk adapter 13 to write the write-data transferred to the main cache memory 14 into the disk array 141. In response to the request, the disk adapter 13 performs a disk-write process ("DSK WRITE" 513 in FIG. 8) in proper timing asynchronous to the "WRITE BACK CACHING" 511 and writes the write-data within the main cache memory 14 into the disk array 141 (arrows 421 and 423).

Also in the sub disk array apparatus 1R, the write back caching of the write-data within the local cache memory 105R into the main cache memory 14R and the writing of the write-data cached in the main cache memory 14R into the disk drive 141R are performed respectively in unique timing asynchronous to the processing of the data-write requests from the remote host computer 50R.

This is the operation of the data-write processing.

Figure 9:
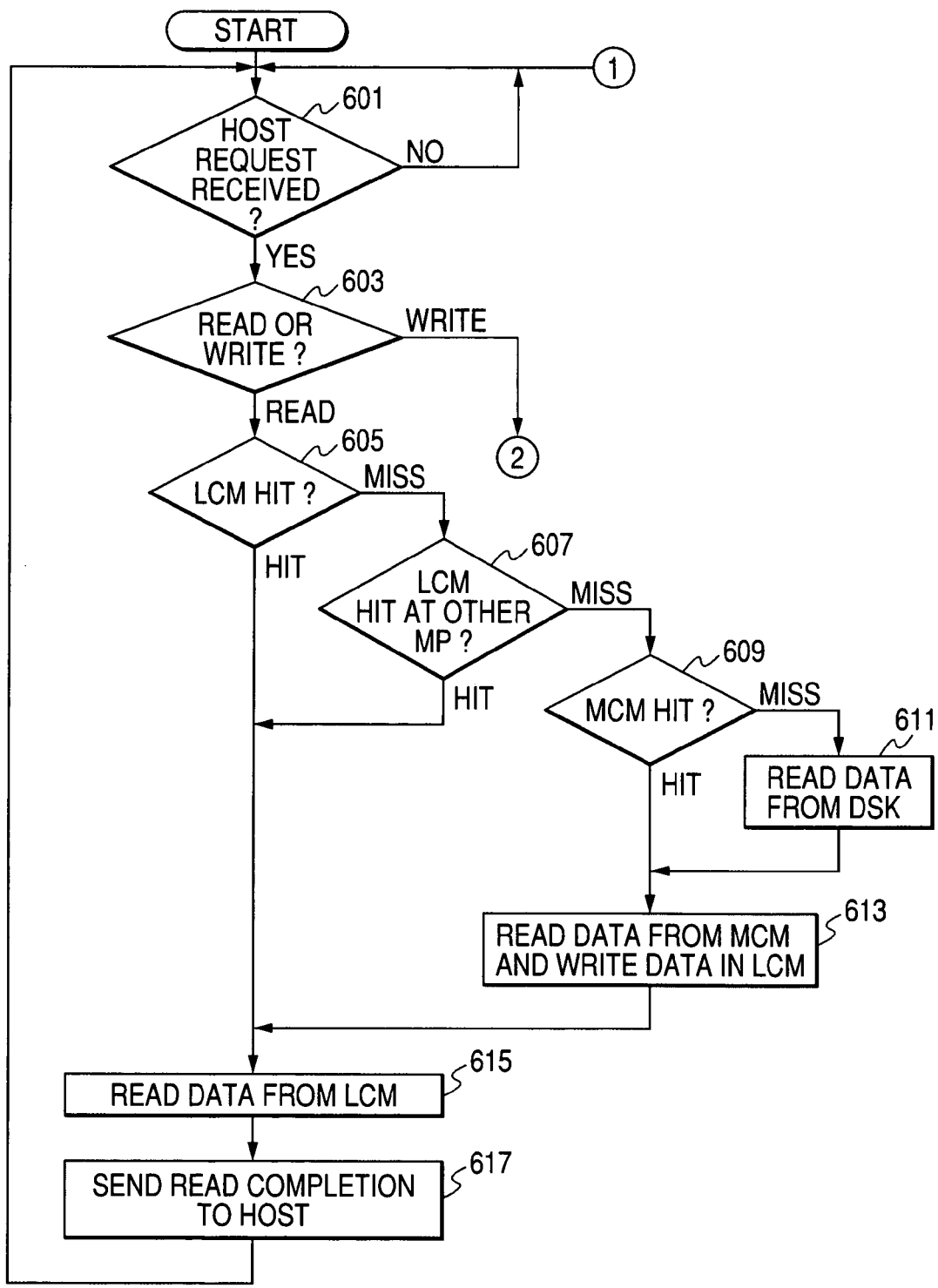
FIG. 9 is a processing flow of a microprocessor 102 within the channel adapter 11 in order to perform data-read and data-write operations.
Figure 10:
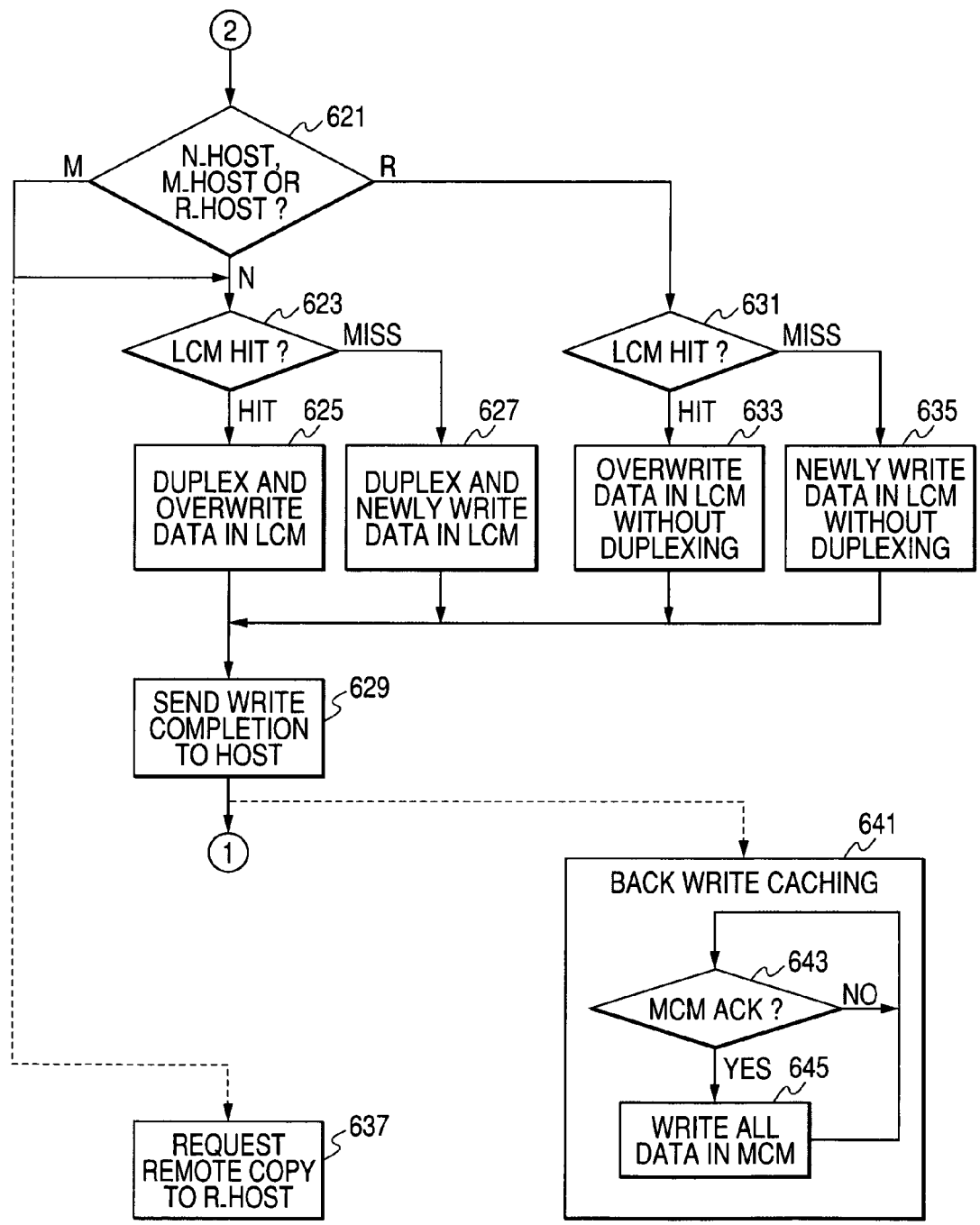
FIG. 10 is a diagram showing a processing flow of the microprocessor 102 within the channel adapter 11 in order to perform data-read and data-write operations.

FIGS. 9 and 10 show processing flows by the microprocessor 102 within the channel adapter 11 where the data-read and data-write operations are performed as described above.

Referring to FIG. 9, at a step 601, the microprocessor 102 checks whether or not a data read/write request from the host computer has been received. When the read/write request has been received, whether the request is a read-request or a write-request is identified at a step 603. If the request is the write-request as a result, the control goes to the flow shown in FIG. 10. If the request is the read-request, whether the read-data is cached in the local cache memory 105 or not is checked at the step 606 based on the directory information managed by the microprocessor 102 itself. If the result is READ-HIT, the read-data is read from the local cache memory 105 at a step 615. Then, at a step 617, the read-data and the read-completion response are sent to the host computer.

If the check result is READ-MISS at the step 605, inquiries are made to the other microprocessors within the same channel adapter package at the step 607. Then, based on the directory information managed by the other microprocessors, whether the read-data is cashed in the local cache memory 105 or not is checked. If the result is READ-HIT, the read-data is read from the local cache memory 105 at a step 615. The read-data and the read-completion response are sent to the host computer at a step 617.

If the check results at the step 607 are all READ-MISS, whether the read-data is cached in the main cache memory 14 or not is checked at a step 609. If the result is READ-HIT, the read-data is read from the main cache memory 14 and is written in the local cache memory 105 at a step 613. At the same time, the directory information of the read-data is additionally registered with the directory information within the microprocessor 102. Then, at the step 615, the read-data is read from the local cache memory 105, and, at the step 617, the read data and the read-completion response are sent to the host computer.

If the check result is READ-MISS at the step 609, the disk adapter 13 is instructed at a step 611. The read-data is read from the disk array 141 and is written in the main cache memory 14. Then, at the step 613, the read-data is read from the main cache memory 14 and is written in the local cache memory 105. At the same time, the directory information of the read-data is additionally registered with the directory information within the microprocessor 102. Then, at the step 615, the read-data is read from the local cache memory 105, and the read-data and the read-completion response are sent to the host computer. The processing of the received read request ends here. Thus, the thread for processing the read/write request in the microprocessor 102 returns to the step 601 in FIG. 9 and can move to the processing for the next coming read/write request.

Next, referring to FIG. 10, if a write-request from the host computer 50 is received, the type of the host computer 50 is identified at a step 621. Furthermore, at a step 623 or 631, whether the write-data exists in the local cache memory 105 or not is checked. If the check result at the step 621 is the normal or master host computer, and if the check result at the step 623 is WRITE-HIT, the write-data is duplexed and is overwritten on the storage area under the corresponding address of the local cache memory 105 at a step 625. On the other hand, if the check result at the step 623 is WRITE- MISS, the write-data is duplexed and is additionally written to in the storage area under the empty address of the local cache memory 105 at a step 627. If the check result at the step 621 is the remote-host computer, and if the check result at the step 632 is WRITE-HIT, the write data is overwritten on the storage area under the corresponding address of the local cache memory 105 at a step 633 without duplexing. On the other hand, if the check result at the step 631 is WRITE-MISS, the write-data is additionally written in the storage area under the empty address of the local cache memory 105 at the step 635 without duplexing. After the write-data is stored in the local cache memory 105 in this way, the write-completion response is returned to the host computer 50 at a step 629. Then, the processing of the received write-request ends here. Thus, the thread for processing the read/write request in the microprocessor 102 returns to the step 601 in FIG. 9 and can move to the processing of the next coming read/write request.

If the check result is the master host computer at the step 621, a request for the remote copy of the write-data is sent to the remote host computer at a step 637 asynchronous to the processing of the write-request.

Furthermore, write-back caching processing can be performed at a step 641 asynchronous to the processing of the write-request. In this processing, all of the write-data stored in the local cache memory 105 but still not recorded in the disk array 141 are read from the local cache memory 105, are transferred to the main cache memory 14 and are written therein (steps 643 and 645).

Figure 11:
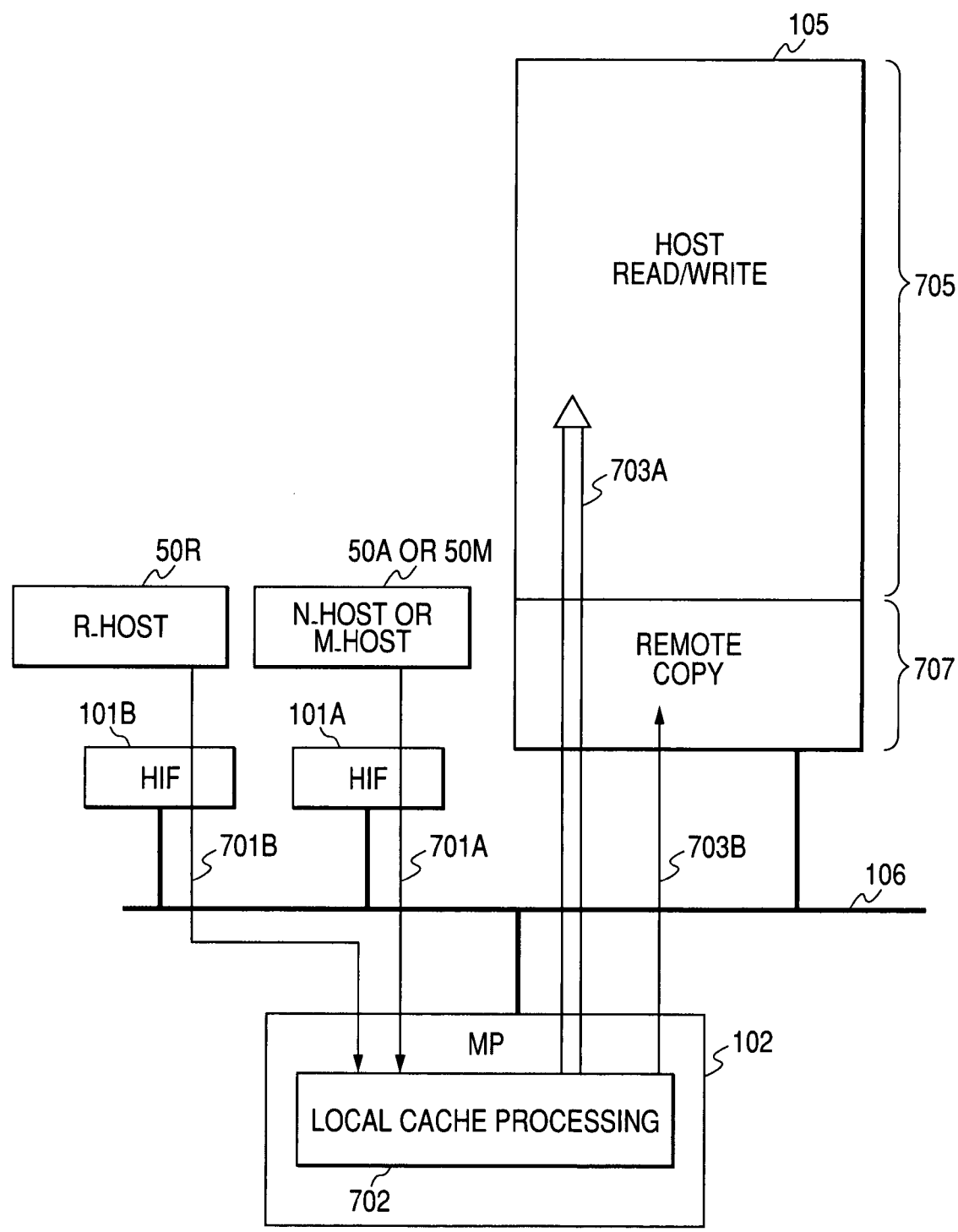
FIG. 11 is a diagram for explaining an operation for using a storage area of a local cache memory 105 differently for host read/write and for remote copy.
Figure 12:
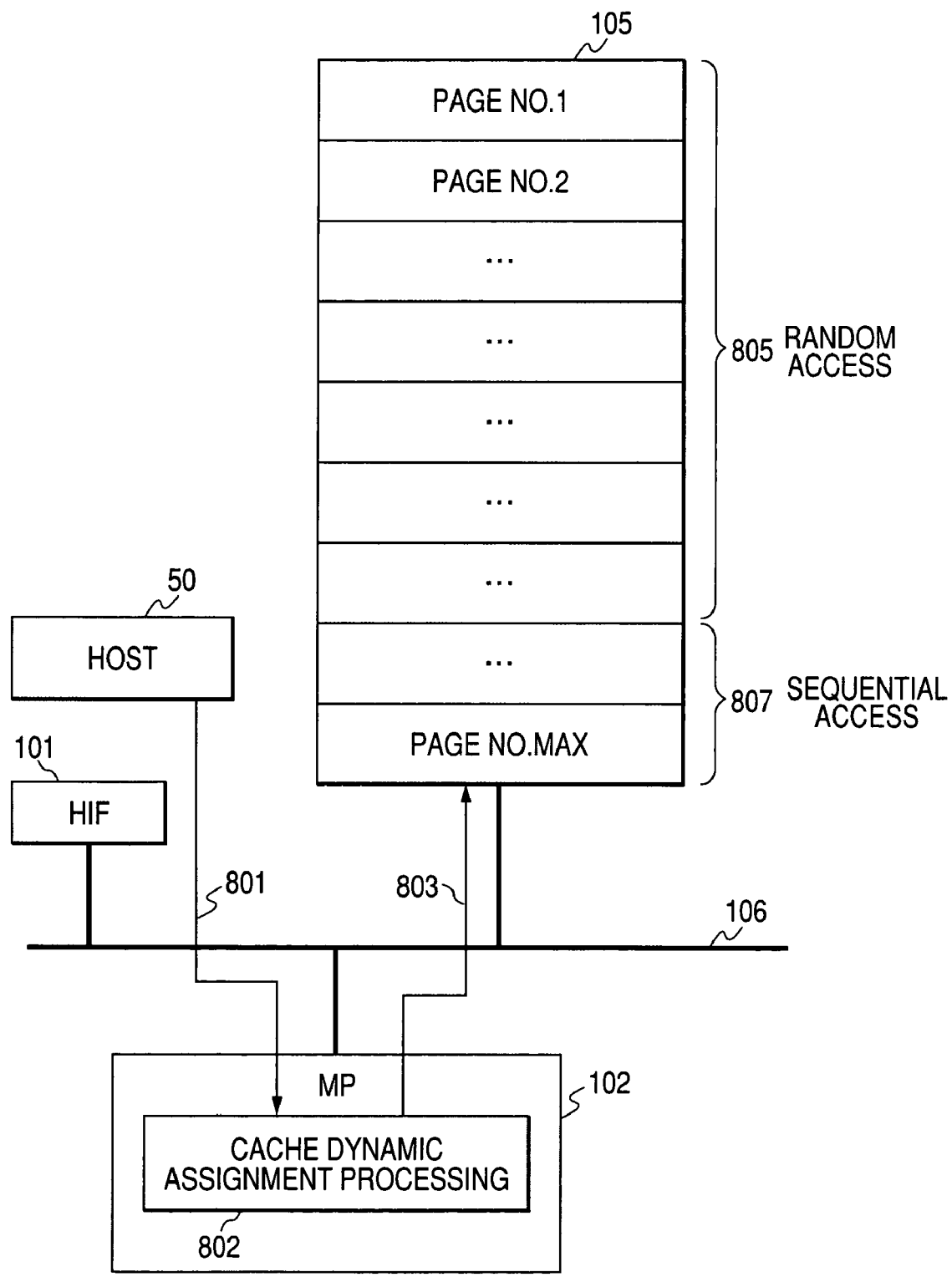
FIG. 12 is a diagram for explaining an operation for using a storage area of the local cache memory 105 differently for random access and for sequential access.

FIGS. 11 and 12 show two kinds of operational examples where a storage area of the local cache memory 105 is divided into multiple sub areas, which are differently used in accordance with the application.

FIG. 11 shows an operational example where a storage area of the local cache memory 105 is differently used for host read/write (HOST READ/WRITE) and for remote copy (REMOTE COPY).

For example, as shown in FIG. 11, the disk array apparatus can receive data access requests from the normal host computer 50N or the master host computer 50M and can receive data access requests from the remote host computer 50R. In the disk array apparatus, the microprocessor 102 of the channel adapter manages the storage area of the local cache memory 105 by dividing the storage area into a cache area 705 for host read/write (HOST READ/WRITE) and a cache area 707 for remote copy (REMOTE COPY). Then, if a data-write request (arrow 701A) from the normal host computer 50N or the master host computer 50M is received, the microprocessor 102 duplexes and writes the write-data in the cache area 705 for host read/write (arrow 703A) in order to write the received write data to the local cache memory 105 ("LOCAL CACHE PROCESSING" 702). On the other hand, if a data-write request (arrow 701B) for remote copy from the remote host computer 50R is received, the microprocessor 102 writes the write-data in the cache area 707 (arrow 703b) for remote copy without duplexing at the "LOCAL CACHE PROCESSING" 702.

FIG. 12 shows an operational example for differently using the storage area of the local cache memory 105 for random access and for sequential access.

As shown in FIG. 12, the microprocessor 102 of the channel adapter manages the storage area of the local cache memory 105 by dividing the storage area into a cache area 805 for random access (RANDOM ACCESS) and a cache area 807 for sequential access (SEQUENTIAL ACCESS). The storage area of the local cache memory 105 is logically divided into many cache pages (from PAGE No. 1 to PAGE No. MAX). The microprocessor 102 of the channel adapter assigns in principle a larger storage area (more cache pages, for example) to the cache area 805 for random access (RANDOM ACCESS) expecting more hits than the storage area assigned to the cache area 807 for sequential access (SEQUENTIAL ACCESS). The cache area 807 for sequential accesses can be mainly used for the first reading of cache data. For example, when one data access is 4 kB, data of 256 kB may be read first from the main cache memory 14 once and may be transferred to the cache area 807 for sequential accesses of the local cache memory 105. As a result, 64 accesses result in HIT in the local cache memory 105.

The microprocessor 102 performs cache dynamic assignment processing 802 so that the proportion in size (such as in number of pages) of the cache area 805 for random access and the cache area 807 for sequential access can be dynamically adjusted and optimized in accordance with the frequency of the random access and sequential access. For example, When the frequency of the sequential access increases, the area size of the cache area 807 for sequential access is increased. Thus, the amount of the first cache-reading can be increased, which can improve the hit rate. Even when the frequency of the sequential access is low, at least a cache area in a certain size is assigned to the sequential access. For example, when the local cache memory 105 includes 256 memory chips, at least 16 memory chips, for example, are assigned to the sequential access.

The cache dynamic assignment processing 802 can be performed as follows, for example.

For example, it is assumed that the total number of cache pages (TotalCachePageNo) of the local cache memory 105 is 1024 pages, and the number of multi-threads, which can process different access requests in parallel, is 128 threads. In this case, the minimum number of cache pages (MIN_CashePageNo) to be assigned to the cache area 807 for sequential access can be set to one page, for example. The maximum number of cache pages (MAX_CashePageNo) can be set to 128 pages, which is the same as the number of multi-threads. In accordance with these settings, the number of cache pages (DynamIndex) to be currently assigned to the cache area 807 for sequential access can be determined in the range between the set minimum number of cache pages (MIN_CashePageNo) and the set maximum number of cache pages (MAX_CashePageNo) by using the following equation:

DynamIndex=MAX_CashePageNo×(fSequential/fTotal)

where "fsequential" is the number of sequential accesses having been performed recently. The initial value is zero (0) and is incremented every time a sequential access is performed. Furthermore, "fTotal" is a total number of accesses including sequential accesses and random accesses having been performed recently. The initial value is zero (0) and is incremented every time a sequential access or random access is performed. It should be noted that both "fsequential" and "fTotal" are initialized to zero (0) when no accesses are performed for a certain period of time (such as 50 ms).

In this example, the number of cache pages (DynamIndex) to be assigned to the cache area 807 for sequential access is dynamically adjusted in accordance with the frequency proportion of all of the recent and past sequential accesses in process from the predetermined minimum number of cache pages (MIN_CashePageNo) to the predetermined maximum number of cache pages (MAX_CashePageNo, such as the number of pages equal to the number of multi-threads). The remaining number of cache pages (Total CashePageNo−DynamIndex) is assigned to the cache area 805 for random access.

In this way, the proportion of the cache area 805 for random access and cache area 807 for sequential access of the local cache memory 105 can be dynamically controlled. At the same time, the first reading of data from the main cache memory 14 to the local cache memory 105 (especially, the cache area 807 for sequential access) and the batch loading of cache data from the local cache memory 105 to the main cache memory 14 can be controlled. Thus, the performance for data input/output to the host computer 50 can be faster.

The embodiment of the invention has been described above. However, the embodiment is only an example for describing the invention, and the scope of the invention should not be limited to the invention. The invention can be implemented in other various forms without departing from the principle.

What is claimed is:

1. A storage system, comprising:
   at least one channel adapter package having multiple channel adapters each for performing data communication with one or more host devices;
   each of the multiple channel adapters comprising:
      two or more processors for controlling the data communication with the host devices;
      a local cache memory for temporarily storing data accessed by the host devices,
      an internal bus for connecting the two or more processors and the local cache memory and for allowing faster data transmission than that of a connection network,
   multiple storage devices for storing data in a RAID disk array;
   multiple storage adapters each for performing data communication with the multiple storage devices;
   a main cache memory for temporarily storing data exchanged between the multiple channel adapters and the multiple storage adapters; and
   the connection network for connecting the multiple channel adapters and the multiple storage adapters to the main cache memory,
   wherein each of the processors can directly access the local cache memory through the internal bus within each of the channel adapters;
   wherein, when each of the processors within each of the channel adapters receives write-data and a write-request with respect to the write-data from the host device, the write data is written in the local cache memory, directory information for locating the storage area of the write-data in the storage device is stored, a response to the write-request is sent to the host device, and the write-data is transferred from the local cache memory to the main cache memory through the connection network such that the write-data can be written in the storage device by the storage adapter,
   wherein each of the processors writes the write-data in the local cache memory and stores the directory information of the write-data synchronously to a process from the receipt of the write-request to the transmission of the response to the host device, and transfers the write-data from the local cache memory to the main cache memory by a back-write caching method asynchronously to the process from the receipt of the write-request to the transmission of the response to the host device,
   wherein the multiple channel adapters are mounted on the channel adapter package, and the multiple channel adapters are connected to each other through the internal bus such that the local cache memory of each of the multiple channel adapters on the channel adapter package is used as distributed local cache memory, and
   on the channel adapter package, each of the processors within the multiple channel adapters can directly access not only the local cache memory within the same channel adapter but also the local cache memory within another channel adapter on a same said channel adapter package through the internal bus; and
   wherein the connection network has a construction in accordance with a hierarchical starnet architecture.

2. A storage system according to claim 1,
   wherein, when one of the two or more processors receives a read-request from the host device,
   the one processor:
   checks whether or not the read-data exists in the local cache memory controlled by the one processor which receives the read request and then checks each other local cache memory other than the local cache memory controlled by the one processor of said channel adapter package based on the directory information stored by the one processor;
   if the read-data exists in any said checked local cache memory, sends the read-data to the host device; and
   if the read-data does not exist in any said checked local cache memory, reads the read-data from the main cache memory through the connection network, writes the read-data read from the main cache memory to the local cache memory controlled by the one processor which receives the read request, stores directory information for locating the storage area of the read-data within the storage device, and sends the read-data to the host device.

3. A storage system according to claim 1,
   wherein, if one of the two or more processors receives the write-request from the host device, the write-data is duplexed and is written in the local cache memory.

4. A storage system according to claim 1,
   wherein if one of the two or more processors receives the write-request from the host device and if the write-request is not intended for data remote copy, the one processor makes the write-data duplex and writes the duplex write-data in the local cache memory, and if the write-request is intended for data remote copy, the one processor writes the write-data in the local cache memory without making the write-data duplex.

5. A storage system according to claim 1,
   wherein a storage area of the local cache memory controlled by one of the two or more processors which receives the write request includes a cache area for host read/write and a cache area for remote copy; and
   wherein, if the one processor receives the write-request from the host device and if the write-request is intended for data remote copy, the write-data is written in the cache area for remote copy, and if not, the write-data is written in the cache area for host read/write.

6. A storage system according to claim 1,
wherein a storage area of the local cache memory controlled by one of the two or more processors, includes a cache area for random access for storing data to be randomly accessed by the host device and a cache area for sequential access for storing data to be sequentially accessed;
wherein the one processor variably controls the proportion of the cache area for random access and the cache area for sequential accesses in accordance with the frequency of performing the random access or the sequential access.

7. A storage system according to claim 1, further comprising a shared memory shared by the multiple channel adapters,
wherein the shared memory stores exclusive control information relating to data within the local cache memories; wherein, in accessing data within each said local cache memory, the at least two processors within each of the channel adapters use the exclusive control data within the shared memory so as to avoid conflicts with accesses to same data by others of the processors.

* * * * *